Patented Aug. 14, 1951

2,564,395

UNITED STATES PATENT OFFICE 2,564,395

COPOLYMERS OF DIALLYL PHTHALATE AND DIALLYL ESTERS OF DIMERIZED UNSATURATED FATTY ACIDS

Hans Dannenberg, Berkeley, and Theodore F. Bradley, Oakland, Calif., assignors to Shell Development Company, San Francisco, Calif., a corporation of Delaware No Drawing. Application May 28, 1949, Serial No. 96,142

10 Claims. (Cl. 260—78.5)

This invention relates to novel compositions of matter comprising copolymers of diallyl phthalate with diallyl esters of dimerized unsaturated fatty acids, particularly acids of the type derived from natural oils. It is the object of the invention to supply copolymers which, for many applications, are superior to polymers formed from diallyl phthalate alone.

The polymer of diallyl phthalate, particularly in its infusible form, would be an excellent material for application as a coating to metal and other rigid supporting surfaces were it not for a certain lack of flexibility in the resulting film. Thus, such films have good surface adherence even on long continued immersion in boiling water, and their resistance to attack by alkali and other chemicals is good. However, the diallyl phthalate polymer films have been found to be too brittle to withstand bending, and it has therefore proved impossible to use them on other than the most rigid surfaces. Another disadvantage of diallyl phthalate films is their tendency to blister and peel away from the supporting surface on exposure to superheated steam.

The present invention is based on the discovery that useful copolymers are formed by polymerizing diallyl phthalate with diallyl esters of unsaturated fatty acid dimers, particularly useful copolymers being those which contain from about 20 to 40% of the acid dimer ester and from about 60 to 80% of diallyl phthalate. The infusible films prepared from copolymers of this preferred composition are found to have not only the desired properties of diallyl phthalate polymer films generally as regards hardness, adherence and durability, but good flexibility coupled with an improved resistance against failure on exposure to superheated steam as well.

The diallyl esters of dimerized unsaturated fatty acids used in forming the products of this invention may be obtained by known methods. Thus, to consider first the acid portion of the ester, monoolefinic acids such as palmitoleic, oleic, petroselinic, vaccenic, gadoleic, cetoleic or erucic acids are polymerized by heating in contact with a Friedel-Crafts catalyst such as boron trifluoride, aluminum chloride, stannic chloride or the like, the dimeric polymer being obtained from the reaction mixture by distillation or extraction with selective solvents. While the foregoing dimerized monoolefinic fatty acids can be used in preparing the diallyl esters employed in forming the copolymers of the invention, it is preferred to use the dimers of acids containing at least two olefinic double bonds. More preferably, the initial acids are polyene (di- to pent-ene) fatty acids of 16 to 22 carbon atoms, representative members of which more preferred class are hiragonic acid, linoleic acid, linolenic acid, elaeostearic acid, licanic acid, arachidonic acid and clupanodonic acid. Substantial quantities of one or more of these acids occur (in the form of glycerides) in many natural oils including linseed, soy bean, corn, cottonseed, hempseed, kapok seed, herring, perilla, poppyseed, pilchard, whale, menhaden, mustard, peanut, rapeseed, salmon, sardine, walnut, dehydrated castor, rubber seed, safflower, sesame, tung and oiticica oils. Thus, although there is some variation due to geographical and climatic differences, linseed oil contains about 34% linolenic acid and 48% linoleic acid, soy bean oil about 50% linoleic acid, tung oil about 80% elaeostearic acid, cottonseed oil about 40% linoleic acid, hempseed oil about 50% linoleic acid and 25% linolenic acid, perilla oil about 40% linoleic acid and 45% linolenic acid, and oiticica oil about 10% linolenic and 75% licanic acid. These various polymerizable polyene acids, if not already available as such, may be recovered from the natural oils and converted into the dimer form by known methods. In one method, a mixture of methyl esters of the different acids contained in the starting oil is heated at about 300° C. for several hours under a nitrogen or carbon dioxide atmosphere. Full details of this method are given in a published article, Industrial and Engineering Chemistry, volume 32, pages 802 to 809 (1940). After the polymerization treatment, the resulting product is distilled to remove unreacted material and the polymerized acids obtained therefrom by saponification. Another method is to subject the free acids secured in the usual fashion from the aforementioned oils to heat treatment at about 330° C. to 360° C. for 3 to 8 hours under 85 to 400 pounds steam pressure, the resulting product then being distilled to remove unreacted monomeric acid. Either method gives a substance which is predominantly dimerized fatty acid. While the product contains an insignificant proportion of higher polymer, it is primarily made up of dicarboxylic acids containing from 32 to 44 carbon atoms. It will be understood that in referring to the dimer acid derived from natural oils, or to the diallyl ester thereof, as soy bean, linseed or cottonseed dimer acid, what is meant is the dimerized polyene fatty acid or mixture of dimerized polyene fatty acids which is obtained as a result of processing the natural oil as a whole.

Once the dimerized unsaturated fatty acid or acid dimer mixture has been obtained, its diallyl ester may be prepared in known fashion. One method is that of direct esterification, the reaction preferably being conducted in the presence of a suitable catalyst such as p-toluene sulfonic acid or sulfuric acid. Another method is that of transesterification and is exemplified by the reaction of dimethyl dilinoleate and allyl alcohol in the presence of sodium hydroxide, sodium, zinc dilinoleate or zinc oxide to form diallyl dilinoleate. Other methods known in the art for preparing esters of the type here contemplated may also be used.

In general, it may be stated that the copolymers of this invention are obtained by maintaining a mixture of diallyl pthalate monomer with the diallyl ester of the desired dimerized fatty acid at elevated temperatures of from about 150° C. to 250° C., preferably in the presence of from about 0.01 to 1% of a peroxide polymerization catalyst such as benzoyl peroxide, tertiary butyl hydroperoxide, di (tertiary butyl) peroxide or lauroyl peroxide, for a period of time sufficient to effect the desired degree of copolymerization, a period which will normally range from about ½ to 3 hours. In some cases it suffices simply to bubble air or oxygen through the heated reaction mixture, though in this case the reaction period is generally extended to 4 or more hours. By interrupting the reaction short of the stage where gelation occurs, there is obtained a soluble copolymer which remains in solution in the unreacted monomer portions of the mixture. This solution may be used without further modification, or its copolymer portion may be removed for use either as such or in processes involving its further polymerization. If, on the other hand, this solution of soluble copolymer is polymerized still further, there is obtained a gel which, though insoluble in various organic solvents including acetone, toluene, or the starting mixture of diallyl ester monomers, is fusible and (usually when dried and powdered) may be molded and cured to the infusible state by the application of heat and pressure. The gel is intermediate in respect to degree of polymerization between the soluble form of the copolymer and the insoluble and infusible form thereof.

In their soluble state, the copolymers of this invention vary in physical condition from viscous liquids to hard solids. When used for coating purposes, they are normally applied in solution form and are then converted into the desired infusible state either by drying in air or by baking in an oven, the latter method being preferred. In air-drying operations, and optionally when baking, this curing is conducted in the presence of a catalyst which, for example, may take the form of a peroxide such as benzoyl peroxide, lauroyl peroxide, acetyl benzoyl peroxide, di (tertiary butyl) peroxide, tertiary butyl hydroperoxide and di (tertiary butyl) diperphthalate, or there may be used metallic drying salts as cobalt, lead and/or manganese naphthalate, linoleate, octoate or the like. Particularly good results have been obtained by using from 0.2 to 5% of a peroxide catalyst such as tertiary butyl hydroperoxide or di-tertiary butyl diperphthalate, together with from about 0.01 to 0.1% of cobalt octoate.

The completely polymerized copolymers, which are infusible as well as being insoluble in acetone, alcohol, toluene and other solvents, are the most useful products of the invention for application as molded articles or as coatings. Thus, for example, tin-plated steel surfaces having an infusible film of suitably compounded copolymer affixed thereto find numerous uses in the packaging of both foods and beverages. These films, while hard and resistant to attack even by boiling liquids or caustic solutions, adhere well to the underlying surface and are sufficiently flexible to accommodate themselves to the flexion movements experienced by the underlying metal surfaces without parting therefrom. Further, they stand up well in an atmosphere of superheated steam for several hours.

The copolymers of this invention may, if desired, be utilized in admixture with additives such as colorants, plasticizers, and the various cellulose derivatives, including alpha-cellulose, wood flour and the like. Such substances are preferably incorporated in the copolymer in its soluble form, after which the composition may either be molded or applied as a coating, and cured to the infusible state.

When the copolymer of this invention is to be used to provide a durable, though flexible, protective film, it is essential that the monomer mixture employed in compounding the copolymer, and hence the copolymer itself, comprise from about 20 to 40% of the diallyl ester of the dimer acid and from about 60 to 80% diallyl phthalate. As the proportion of dimer acid ester becomes less than 20%, the films formed from the copolymer will be found to be insufficiently pliable, while as the content of this ester exceeds about 40% the resulting films become softer than desired, and their resistance to attack by boiling water, superheated steam, alkaline solutions and other chemicals is appreciably impaired. On the other hand, it should not be lost sight of that when the copolymer of this invention is used for purposes other than to provide an infusible coating, valuable compositions are obtained in the case of those copolymers containing as little as about 10% of the diallyl ester of the dimer acid and as much as about 60% thereof. It may here be noted that the conditions prevailing during the copolymerization reaction are such that the ratio of components in the copolymer is substantially the same as in the original monomer mixture.

The following examples illustrate the present invention in various of its embodiments:

EXAMPLE I

A copolymer of diallyl phthalate and the diallyl ester of a dimerized, polyene fatty acid of linseed oil was prepared. The diallyl ester of the dimer acid, it may be noted, had been prepared by mixing in a reactor 2.1 grams of 96% sulfuric acid, 1 gram water, 36 grams allyl alcohol, 100 grams xylene and 400 grams of linseed dimer acid in the order given, whereupon the mixture was heated to 110° C. A mixture of 150 grams allyl alcohol and 75 ml. of benzene was then gradually added to the hot mixture which was refluxed for 5.5 hours, there being distilled off 33 ml. of an aqueous phase during this heating period. The product in the reactor was then shaken with 10 grams barium hydroxide and 20 grams of active clay, allowed to stand overnight and filtered. The color of the product was then improved by shaking it with 10 grams of active carbon followed by filtering and heating in vacuo to remove volatiles. This yielded 384 grams of the desired diallyl ester. To prepare the copolymer, a mixture of 100 grams of the foregoing diallyl ester of linseed acid dimer and 230 grams of diallyl phthalate was heated to 200° C. While the charge was agitated rapidly and air eliminated by a stream of carbon dioxide, a solution of tertiary butyl hydroperoxide in diallyl phthalate, containing 0.11 gram peroxide per ml., was intermittently added to the charge in 2 ml. portions. Each addition caused an immediate (exothermic) polymerization which came to a standstill after a short time, whereupon another portion of catalyst was added. After an addition of 11.8 ml. of the catalyst solution (equal to 3 grams of peroxide per 100 grams of monomer mixture) the refractive index ($n_d^{20}$) of the charge was found to have increased from 1.5106 to 1.5268 and heating was discontinued. The product, which had a viscosity of 46 poises at 25° C. was then stirred into 3 liters of isopropyl alcohol to precipitate the polymer. The latter, after decantation of the liquid, was kneaded with 200 ml. of isopropyl alcohol, dissolved in 200 ml. acetone and again reprecipitated with isopropyl alcohol. After drying in vacuo, there were obtained 136 grams of copolymer in the form of an amber-colored, brittle solid.

EXAMPLE II

It was desired to provide tin-plated steel sheets of the type employed in fabricating food and beverage containers with a thin film of an insoluble resin. To that end, the copolymer prepared in Example I was dissolved in an equal weight of methyl isobutyl ketone and the solution diluted with a mixture of toluene and xylene (3:1 by weight) to a viscosity of D on the Gardner-Holdt scale. To the solution was then added 0.5% tertiary butyl hydroperoxide and 0.025% cobalt octoate. Two coatings of this solution were applied to tin-plated steel panels, each coat being baked first for 20 minutes at 120° C. and then for 20 minutes at 180° C. The final film obtained in this fashion was unfusible and insoluble in toluene, and it had a thickness of 1.8 mils. The flexibility of the film was then measured by bending the panels 180 degrees about a rod of ½ inch diameter, and recording as failures those films which cracked in the region of the bend. Other measurements were made to determine the resistance of the films to attack by boiling water and a 5% KOH solution, as well as superheated steam. The results of these tests are indicated in the table, which follows Example VIII.

EXAMPLE III

In this example there was prepared a copolymer made up of 70% diallyl phthalate and 30% of the diallyl ester of cottonseed dimer acid. The procedure followed with the same that set forth in Example I, though here the starting mixture, which weighed 298 grams, was heated at 200° C. for 1½ hours during which time its refractive index ($n_d^{20}$) rose from 1.5060 to 1.5129. There were recovered 116 grams of a hard, solid, yellow copolymer, soluble in toluene as well as other solvents, and fusible on heating. This copolymer was then applied as an infusible film (1.3 mils thick) on tin-plated steel panels according to the procedure outlined in Example II. The properties of these films are also expressed in the table.

EXAMPLE IV

A companion operation similar in every respect to that described in Example I above was conducted, but using a monomer mixture made up of 15% of the diallyl ester of soy bean acid dimer and 85% diallyl phthalate. Here the initial polymerization reaction was conducted at 203° C. for 1½ hours with the addition of 0.11% by weight of the tertiary butyl hydroperoxide catalyst, whereby the refractive index ($n_d^{20}$) of the mixture was changed from 1.5121 to 1.5302. The resulting soluble copolymer, recovered in the amount of 132 grams, was a light colored, soft solid. Infusible films were prepared from this material according to the method described in Example II, though here each coat was first baked for 30 minutes at 120° C. and then for 30 minutes at 180° C., and the final film had a thickness of 1.3 mils. The properties of this film are given in the table.

EXAMPLE V

In this operation 154 grams of soluble copolymer in the form of a viscous liquid were prepared according to the method of Example I from 355 grams of a monomer mixture made up of 30% of the diallyl ester of soy bean dimer acid and 70% diallyl phthalate. There was added 0.238% of tertiary butyl hydroperoxide as the reaction mixture was heated at 203° C. for 3 hours, during which time the refractive index ($n_d^{20}$) of the mixture changing from 1.5075 to 1.5242. Films were prepared from the copolymer according to the method described in Example II, though here the only baking treatment given each coating of the copolymer on the tin-plated steel specimens was one of 20 minutes at 180° C. The properties of this film which was 1.2 mils thick also appear in the table.

EXAMPLE VI

A soluble copolymer containing 22% of the diallyl ester of soy bean acid dimer and 78% diallyl phthalate was prepared by blending 45 parts of the soluble copolymer described in Example IV with 37.5 parts of that described in Example V. Infusible films were then formed from this copolymer on tin-plated steel sheets in the manner outlined in Example II, the resulting film having a thickness of 1.2 mils, with each coat being baked first for 30 minutes at 120° C. and then for 30 minutes at 180° C. The properties of the film are given in the table.

EXAMPLE VII

There were prepared 9.5 grams of a soluble copolymer having the appearance of a soft, dark solid, from 30 grams of a monomer mixture made up of 50% diallyl phthalate and 50% diallyl ester of soy bean dimer acid. In this case the procedure employed in forming the dimer ester and the soluble copolymer was the same as that described in Example I except that here the tertiary butyl hydroperoxide was eliminated and air was continuously blown through the mixture as the latter was maintained at 200° C. for 4½ hours. During this period the refractive index ($n_d^{20}$) of the mixture changed from 1.5017 to 1.5157. Insoluble films on tin-plated steel specimens were also formed from this copolymer according to the method described in Example II, though here but one coating of the material was applied and the same was dried by heating for 20 minutes at 180° C. The resulting film had a thickness of 1.1 mils.

EXAMPLE VIII

For the purpose of comparison with the copolymers described in the foregoing examples, a polymer of diallyl phthalate was obtained by heating 386 grams of the monomer for 1½ hours at 200° C., with the intermittent addition of 0.016% tertiary butyl hydroperoxide catalyst. During this heating period the refractive index of the material changed from 1.5190 to 1.5391. By precipitation with methanol there were recovered 109 grams of a solid, fusible polymer, the same being soluble in toluene and other solvents. Infusible films were then prepared from this polymer according to the method of Example II, but with each coating applied to the tin-coated steel surface being baked for 20 minutes at 120° C. The thickness of the final film was 1.2 mils, and its properties are given in the table to follow:

*Comparative properties of infusible films prepared from diallyl phthalate polymer and from diallyl phthalate-dimer acid ester*

| Example in which described | Component other than Diallyl Phthalate | Flexibility on bending 180° over rod of ⅛" diameter | Immersion in boiling water | Immersion in 5% KOH solution | Exposure in Autoclave to steam at 15 lbs. per sq. in. pressure for 2 hours |
|---|---|---|---|---|---|
| VIII | none | failed | slight blistering after 2 hrs. | unchanged after 16 hrs. | blistered and loosened. |
| IV | 15% Diallyl soy bean dimer ester | do | unchanged after 1½ hrs. | loosened after 24 hrs. | blistered.[1] |
| VI | 22% Diallyl soy bean dimer ester | passed | do | unchanged after 24 hrs. | unchanged. |
| V | 30% Diallyl soy bean dimer ester | do | do | unchanged after 48 hrs. | Do. |
| VII | 50% Diallyl soy bean dimer ester | do | blistered and loosened after 1½ hrs. | loosened and swollen after 1½ hrs. | |
| II | 30% Diallyl linseed dimer ester | do | unchanged after 1½ hrs. | loosened after 90 hrs. | blistered.[1] |
| III | 30% Diallyl cottonseed dimer ester | do | do | unchanged after 90 hrs. | Do.[1] |

[1] While somewhat blistered, the condition of these films was still greatly superior to that of the diallyl phthalate film.

From the above data it will be noted that those films compounded with less than about 20% of the diallyl ester of the acid dimer did not possess sufficient flexibility, while those which contained as much as 50% of the acid dimer ester were unsatisfactory in a number of other particulars. From this the conclusion has been reached that films of the desired quality are produced only as the acid dimer ester content of the copolymer is maintained between about 20 and 40%.

The various percentages expressed herein are on a weight basis.

The invention claimed is:

1. A copolymer containing from about 40 to 90% of diallyl phthalate and from about 10 to 60% of a diallyl ester of a dimerized, olefinically unsaturated fatty acid, said fatty acid containing at least 16 carbon atoms in the molecule.

2. A copolymer containing from about 40 to 90% of diallyl phthalate and from about 10 to 60% of a diallyl ester of a dimer of an olefinically unsaturated fatty acid of a natural glyceride oil, said fatty acid containing from 16 to 22 carbon atoms.

3. A copolymer containing from about 40 to 90% of diallyl phthalate and from about 10 to 60% of a diallyl ester of a dimer of a polyene fatty acid, said fatty acid containing from 2 to 5 olefinic double bonds and from 16 to 22 carbon atoms.

4. A toluene-soluble copolymer containing from about 60 to 80% diallyl phthalate and from about 20 to 40% of a diallyl ester of a dimer of an olefinically unsaturated fatty acid of a natural glyceride oil, said fatty acid containing from 16 to 22 carbon atoms.

5. The infusible, toluene-insoluble copolymer obtained by further polymerizing the copolymer of claim 4.

6. An infusible, flexible film adherent to a supporting surface, said film comprising a copolymer containing from about 60 to 80% diallyl phthalate and from about 20 to 40% of a diallyl ester of a dimer of an olefinically unsaturated fatty acid of a natural glyceride oil, said fatty acid containing from 16 to 22 carbon atoms.

7. A copolymer comprising about 20 to 40% of the diallyl ester of a dimerized polyene fatty acid of linseed oil and about 60 to 80% diallyl phthalate.

8. A copolymer comprising about 20 to 40% of the diallyl ester of a dimerized polyene fatty acid of soy bean oil and about 60 to 80% diallyl phthalate.

9. A copolymer comprising about 20 to 40% of the diallyl ester of a dimerized polyene fatty acid of cotton seed oil and about 60 to 80% diallyl phthalate.

10. An infusible flexible film adherent to a supporting surface, said film comprising a copolymer made up of about 20 to 40% of a diallyl ester of a dimerized polyene fatty acid of soy bean oil and about 60 to 80% diallyl phthalate.

HANS DANNENBERG.
THEODORE F. BRADLEY.

REFERENCES CITED

The following references are of record in the file of this patent:

Teeter et al.: Oil and Soap, July 1945, pp. 177–180.